United States Patent
Chang

(10) Patent No.: US 10,776,296 B2
(45) Date of Patent: Sep. 15, 2020

(54) CONTROL METHOD

(71) Applicant: Nuvoton Technology Corporation, Hsinchu (TW)

(72) Inventor: Sheng-Tsai Chang, Yuanlin (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 0 days.

(21) Appl. No.: 16/434,487

(22) Filed: Jun. 7, 2019

(65) Prior Publication Data
US 2020/0110719 A1 Apr. 9, 2020

(30) Foreign Application Priority Data
Oct. 8, 2018 (TW) .............................. 107135383 A

(51) Int. Cl.
*G06F 13/37* (2006.01)
*G06F 13/40* (2006.01)

(52) U.S. Cl.
CPC .......... *G06F 13/37* (2013.01); *G06F 13/4022* (2013.01)

(58) Field of Classification Search
CPC .............................. G06F 13/37; G06F 13/4022
See application file for complete search history.

(56) References Cited

U.S. PATENT DOCUMENTS

| | | | | |
|---|---|---|---|---|
| 2002/0056016 A1* | 5/2002 | Horowitz | ............ | G06F 13/4072 710/104 |
| 2010/0185784 A1* | 7/2010 | De Nie | ............... | G06F 13/4291 710/9 |
| 2016/0117276 A1* | 4/2016 | Park | ...................... | G06F 13/385 710/63 |
| 2017/0177509 A1* | 6/2017 | Kambara | .............. | G06F 13/102 |

* cited by examiner

*Primary Examiner* — Idriss N Alrobaye
*Assistant Examiner* — Ronald T Modo
(74) *Attorney, Agent, or Firm* — Muncy, Geissler, Olds & Lowe, P.C.

(57) ABSTRACT

A control method for a host device includes assigning a first detection command and a first identification number to a first slave device; receiving first response information generated by the first slave device to determine the first function number of the first slave device; and determining whether the first slave device is cascaded to a second slave device. When the first slave device is not cascaded to the second slave device, the host device performs a first specific action according to the first function number, or it directs the first slave device to perform a first specific action. When the first slave device is cascaded to the second slave device, the host device assigns a second detection command and a second identification number to the second slave device and receives second response information generated by the second slave device.

15 Claims, 6 Drawing Sheets

CONTROL METHOD

CROSS REFERENCE TO RELATED APPLICATIONS

This Application claims priority of Taiwan Patent Application No. 107135383, filed on Oct. 8, 2018, the entirety of which is incorporated by reference herein.

BACKGROUND OF THE INVENTION

Field of the Invention

The invention relates to a control method, and more particularly to a control method for controlling a master device and slave devices.

Description of the Related Art

As technology has developed, there has been an increase in the number of different types of electronic devices available on the commercial market, and the functionality of these electronic devices has likewise increased. To reduce the size of these electronic devices, most electronic devices comprise a single connection port. Therefore, each of the electronic devices only communicates to a single external device. When the electronic device wants to connect to many external devices, the electronic device utilizes a hub to indirectly connect to many external devices.

BRIEF SUMMARY OF THE INVENTION

An exemplary embodiment of a control method for a host device coupled to a first slave device is described in the following paragraph. A first detection command and a first identification number are assigned to the first slave device. First response information generated by the first slave device is received to determine a first function number stored in the first slave device. A check is made to determine whether the first slave device is cascaded to a second slave device. In response to determining that the first slave device is not cascaded to the second slave device, the host device performs a first specific action according to the first function number or directs the first slave device to perform the first specific action. In response to determining that the first slave device is cascaded to the second slave device, the host device assigns a second detection command and a second identification number to the second slave device and receives second response information generated by the second slave device to determine a second function number stored in the second slave device.

In accordance with a further embodiment, a method of controlling a first slave device coupled to a host device is described in the following paragraph. A detection command and an identification number are received. A check is made to determine the existence of a second slave device. In response to the second slave device cascaded to the first slave device, the first slave device ignores commands sent by the host device and provides a control signal to the second slave device. First response information is provided to the host device.

In accordance with a further embodiment, a method of controlling a host device and slave devices is described in the following paragraph. A first detection command and a first identification number generated by the host device are assigned to a first slave device of the slave devices. First response information generated by the first slave device is received to determine a first function number stored in the first slave device. A check is made as to determine whether the first slave device is cascaded to a second slave device of the slave devices. In response to determining that the first slave device is cascaded to the second slave device according to a digital value of a specific bit of the first response information, and the host device assigns a second detection command and a second identification number to the second slave device and receives second response information generated by the second slave device to determine a second function number stored in the second slave device.

Control methods may be practiced by the operation systems which have hardware or firmware capable of performing particular functions and may take the form of program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
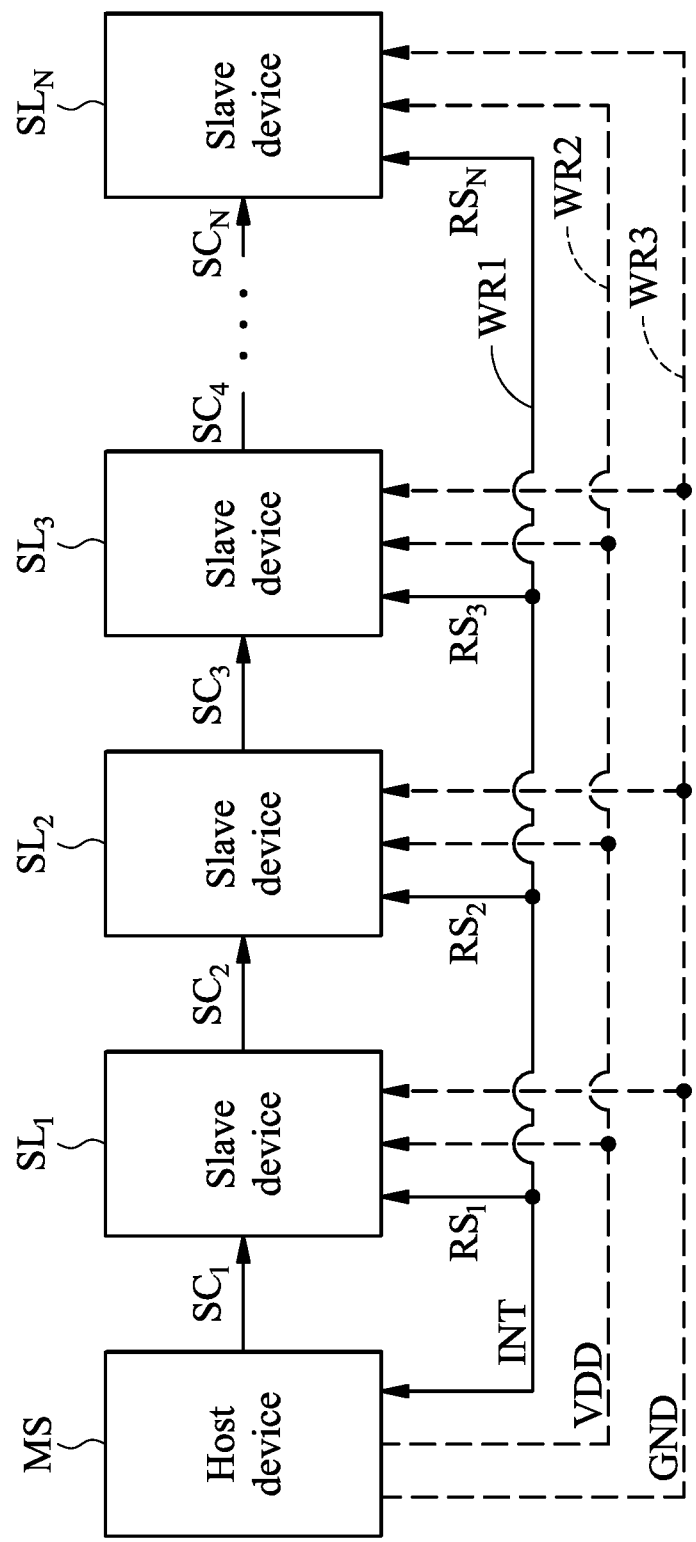
FIG. 1 is a schematic diagram of an exemplary embodiment of an operation system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operation system, according to various aspects of the present disclosure. As shown in FIG. 1, the operation system 100 comprises a host device MS and slave devices $SL_1$~$SL_N$. The host device MS and the slave devices $SL_1$~$SL_N$ are cascaded with each other. In this embodiment, the host device MS assigns a command INT to a specific slave device via a single wire WR1. The specific slave device operates according to the command INT. In one embodiment, the slave devices $SL_1$~$SL_N$ generate response information $RS_1$~$RS_N$ and provide the response information $RS_1$~$RS_N$ to the host device MS via the wire WR1. In this case, the host device MS may operate according to the response information $RS_1$~$RS_N$.

In one embodiment, each of the slave devices $SL_1$~$SL_N$ receives a control signal. When the control signal is enabled, the corresponding slave device reads the command INT. For example, when the host device MS enables the control signal $SC_1$, the slave device $SL_1$ reads the command INT. At this time, since the control signals $SC_2$~$SC_N$ have not been enabled, the slave devices $SL_2$~$SL_N$ do not read the command INT. Similarly, when the slave device $SL_1$ enables the control signal $SC_2$, the slave device $SL_2$ reads the command INT. At this time, the control signal $SC_1$ may be not enabled by the host device MS. Therefore, the slave device $SL_1$ does not read the command INT. In another embodiment, the host device MS still enables the control signal $SC_1$ such that the slave device $SL_1$ reads the command INT. In such cases, the slave device $SL_1$ determines the type of command INT. When the command INT is a detection command, the slave device $SL_1$ stops operating temporarily.

The slave devices $SL_1 SL_N$ operates according to different commands INT. In one embodiment, the command INT is a detection command to assign different identification numbers to different slave devices and require the slave devices $SL_1$~$SL_N$ to reply with the function numbers built in the slave devices $SL_1$~$SL_N$. In this case, the slave devices $SL_1$~$SL_N$ store the identification numbers provided from the host device MS and generate response information $RS_1 RS_N$ to the host device MS. The host device MS may perform various operations corresponding to the function numbers or direct at least one specific slave devices to perform a corresponding operation according to its function number.

Taking the slave devices $SL_1$~$SL_3$ as an example, assume that the function number of the slave device $SL_1$ corresponds to a light-emitting action, the function number of the slave device $SL_2$ corresponds to a music play action, and the function number of the slave device $SL_3$ corresponds to a shock action. In such cases, the host device MS may successively perform the light-emitting action, the music play action, and the shock action according to the function numbers of the slave devices $SL_1$~$SL_3$. In another embodiment, the function number of the slave device $SL_1$ is the same as the function number of the slave device $SL_3$. Assume that each of the function numbers of the slave devices $SL_1$ and $SL_3$ corresponds a light-emitting action. In this case, the host device MS may first perform the light-emitting action, then play music and finally perform the light-emitting action again. In other embodiments, the host device MS directs the slave devices $SL_1$~$SL_3$ to perform their functions corresponding to the function numbers stored in the slave devices $SL_1$~$SL_3$. For example, the slave device $SL_1$ performs the light-emitting action, the slave device $SL_2$ plays music, and the slave device $SL_3$ performs the shock action.

In another embodiment, the command INT is a detection end command to notify the slave devices $SL_1$~$SL_N$ that the detection operation has been finished. For example, after the slave device $SL_1$ replies with the response information $RS_1$ to the host device MS, the slave device $SL_1$ does not depend upon the command NT to operate temporarily. However, when the command NT is a detection end command, the slave device $SL_1$ starts operating according to the command INT. In some embodiments, the slave device $SL_1$ may perform works required by the host device MS or perform action corresponding to the function number stored in the slave device $SL_1$.

In some embodiments, the command INT is an inquiry command to inquire the connection status of each of slave devices $SL_1$~$SL_N$. In this case, the slave device whose connection status has not been changed does not reply with response information to the host device MS. For example, when the slave device $SL_3$ is removed from the slave device $SL_2$, the slave device $SL_2$ sends response information to notify the host device MS. Therefore, the host device MS does not perform the action corresponding to the function number of the slave device $SL_3$. In this case, since the connection status of the slave device $SL_1$ has not been changed, the slave device $SL_1$ does not reply to the command INT.

Additionally, assume that the host device MS is coupled to the slave device $SL_1$ and the slave device $SL_1$ is cascaded to the slave device $SL_2$. In this case, when the slave device $SL_3$ is cascaded to the slave device $SL_2$, since the connection status of the slave device $SL_2$ is changed, the slave device $SL_2$ generates response information $RS_2$ to notify the host device MS. Therefore, the host device MS assigns an identification number to the slave device $SL_3$ and detects the function number of the slave device $SL_3$. In such cases, the host device MS may perform the action corresponding to the function number of the slave device $SL_3$ or direct the slave device $SL_3$ to perform the action corresponding to its function number.

In other embodiments, when a trigger event is occurred in the slave device $SL_2$, the slave device $SL_2$ notifies the host device MS. Therefore, the host device MS performs an action corresponding to the trigger event or directs the slave device $SL_2$ to perform the action corresponding to the trigger event.

The host device MS may support power to the slave devices $SL_1$~$SL_N$. As shown in FIG. 1, the host device MS provides an operation voltage VDD to the slave devices $SL_1$~$SL_N$ via a wire WR2 and provides another operation voltage GND to the slave devices $SL_1$~$SL_N$ via another wire WR3. In some embodiments, each of the slave devices $SL_1 SL_N$ comprises a battery (not shown). In this case, the host device MS does not provide power to the slave devices $SL_1$~$SL_N$. Therefore, the wires WR2 and WR3 can be omitted.

Figure 2:
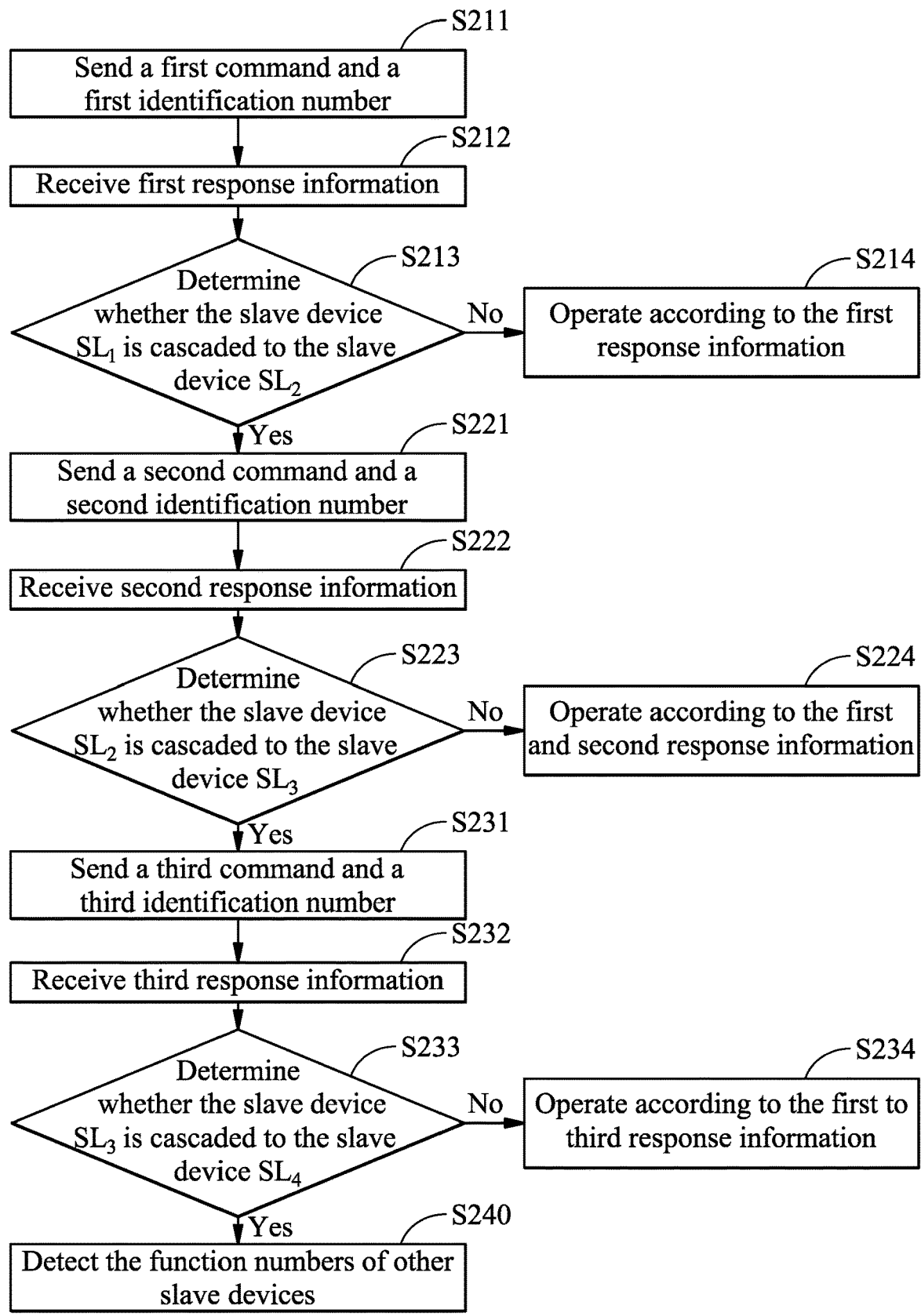
FIG. 2 is a flowchart of an exemplary embodiment of a control method, according to various aspects of the present disclosure.

FIG. 2 is a flowchart of an exemplary embodiment of a control method, according to various aspects of the present disclosure. The control method can be applied to the host device MS. For brevity, assume the host device MS is cascaded to three slave devices (e.g., $SL_1$~$SL_3$).

First, the host device MS sends a first command and a first identification number (step S211). In this embodiment, the first command is a detection command to set the identification number of a specific slave device and require the specific slave device to output the function number built in the specific slave device. In one embodiment, before the host device MS sends the first command, the host device MS first enables the control signal $SC_1$. Therefore, the slave device $SL_1$ operates according to the first command. In this case, the slave device $SL_1$ stores the first identification number and generates response information $RS_1$ according to the function number stored in the slave device $SL_1$. Since the control signals $SC_2$ and $SC_3$ are not enabled, the slave devices $SL_2$ and $SL_3$ do not operate according to the first command temporarily.

Next, the host device MS receives the response information $RS_1$ generated by the slave device $SL_1$ (step S212). Since the slave device $SL_1$ generates the response information $RS_1$ according to the function number stored in the slave device $SL_1$, when the host device MS decodes the response information $RS_1$, the host device MS can determine the function number of the slave device $SL_1$. In some embodiments, after the slave device $SL_1$ sends the response information $RS_1$ according to the command sent by the host device MS, the slave device $SL_1$ does not depend upon the command sent by the host device MS to operate until the command sent by the host device MS is a detection end command. In one embodiment, the slave device $SL_1$ receives and decodes the command sent by the host device MS to determine whether the command sent by the host device MS is a detection command. When the command sent by the host device MS is the detection command, the slave device $SL_1$ ignores the command sent by the host device MS. When the command sent by the host device MS is not the detection command, the slave device $SL_1$ operates according to the command sent by the host device MS. Additionally, when the slave device $SL_1$ discovers the existence of the slave device $SL_2$, the slave device $SL_1$ enables the control signal $SC_2$ to activate the slave device $SL_2$ such that the slave device $SL_2$ operates according to the command sent by the host device MS.

The host device MS determines whether the slave device $SL_1$ is cascaded to the slave device $SL_2$ (step S213). The invention does not limit how the host device MS determines whether the slave device $SL_1$ is cascaded to the slave device $SL_2$. In one embodiment, the host device MS depends upon the digital value of a specific bit of the response information $RS_1$ to determine whether the slave device $SL_1$ is cascaded to the slave device $SL_2$. For example, when the slave device $SL_2$ is cascaded to the slave device $SL_1$, the slave device $SL_1$ sets the digital value of the specific bit equal to a first value (e.g., 1). When the slave device $SL_2$ is not cascaded to the slave device $SL_1$, the slave device $SL_1$ sets the digital value of the specific bit equal to a second value (e.g., 0). Therefore, the host device MS determines whether the digital value of the specific bit is equal to a predetermined value (e.g., 1) to determine whether the slave device $SL_1$ is cascaded to the slave device $SL_2$.

When the slave device $SL_2$ is not cascaded to the slave device $SL_1$, the host device MS operates according to the response information $RS_1$ (step S214). In one embodiment, the host device MS decodes the response information $RS_1$ to detect the function number of the slave device $SL_1$ and then perform an action corresponding to the function number or direct the slave device $SL_1$ to perform the action corresponding to the function number stored in the slave device $SL_1$.

For example, assume that the function number provided by the slave device $SL_1$ represents a light-emitting action, the host device MS performs the light-emitting action in step S214. In another embodiment, the host device MS requires the slave device $SL_1$ to perform the light-emitting action. In this case, the host device MS first sends a detection end command to direct the slave device $SL_1$ to work according to the command NT. Therefore, when the host device MS sends a control command, the slave device $SL_1$ starts radiating light. In other embodiments, the host device MS and the slave device $SL_1$ perform the light-emitting action simultaneously. In some embodiments, the host device MS may be a train engine and the slave device $SL_1$ is a train car. When the function number replied by the slave device $SL_1$ represents a travel action, the host device MS leads the slave device $SL_1$ to travel.

When the slave device $SL_2$ is cascaded to the slave device $SL_1$, the host device MS continuously detects the function number of the slave device $SL_2$ (step S221). In this embodiment, the host device MS sends a second command and a second identification number. The second command is a detection command. Therefore, the slave device $SL_2$ stores the second identification number and generates response information $RS_2$ according to the function number built in the slave device $SL_2$.

Next, the host device MS receives the response information $RS_2$ (step S222). The host device MS determines the function number of the slave device $SL_2$ according to the response information $RS_2$. In some embodiments, after the slave device $SL_2$ provides the slave device $SL_2$ to the host device MS, the slave device $SL_2$ stops operating according to the command sent from the host device MS until the command sent from the host device MS is a detection end command. Since the operation of the slave device $SL_2$ is the same as the operation of the slave device $SL_1$, the operation of the slave device $SL_2$ is omitted.

Then, the host device MS determines whether the slave device $SL_2$ is cascaded to the slave device $SL_3$ (step S223). The invention does not limit how the host device MS determines whether the slave device $SL_2$ is cascaded to the slave device $SL_3$. In one embodiment, the host device MS depends upon the digital value of a specific bit of the response information $RS_2$ to determine whether the slave device $SL_2$ is cascaded to the slave device $SL_3$.

When the slave device $SL_2$ is not cascaded to the slave device $SL_3$, the host device MS operates according to the response information $RS_1$ and $RS_2$ (step S224). In one embodiment, the host device MS performs a first action (e.g., emitting light) corresponding to the function number of the slave device $SL_1$ and performs a second action (e.g., play music) corresponding to the function number of the slave device $SL_2$. In another embodiment, the host device MS directs the slave device $SL_1$ to perform a first action (e.g., emitting light) corresponding to the function number built in the slave device $SL_1$ and directs the slave device $SL_2$ to perform a second action (e.g., play music) corresponding to the function number built in the slave device $SL_2$. In this case, the host device MS first sends a detection end command to direct the slave devices $SL_1$ and $SL_2$ operating according to the command INT. In one embodiment, the host device MS is a train head, and the slave devices $SL_1$ and $SL_2$ are train cars. In this case, when the function number of the slave device $SL_1$ represents a go-forward action and the function number of the slave device $SL_2$ represents a turn-right action, the host device MS with the slave devices $SL_1$ and $SL_2$ first goes forward and then turns right.

When the slave device $SL_2$ is cascaded to the slave device $SL_3$, the host device MS sends a third command and a third identification number to the slave device $SL_3$ (step S231). In this embodiment, the third command is also a detection command. In one embodiment, before step S231, the slave device $SL_2$ enables the control signal $SC_3$ to activate the slave device $SL_3$ to receive the third command. In other embodiments, since the slave devices $SL_1$ and $SL_2$ have replied with their function numbers, when the host device MS sends the third command, the slave devices $SL_1$ and $SL_2$ do not depend upon the third command to work.

Next, the host device MS receives the response information $RS_3$ generated by the slave device $SL_3$ (step S232). The host device MS determines the function number of the slave device $SL_3$ according to the response information $RS_3$. In some embodiments, after the slave device $SL_3$ has replied the response information $RS_3$ to the host device MS, the slave device $SL_3$ does not depend upon the command INT sent by the host device MS to work until the command sent by the host device MS is a detection end command. Since the operation of the slave device $SL_3$ is the same as the operation of the slave device $SL_1$, the description of the operation of the slave device $SL_3$ is omitted.

Then, the host device MS determines whether the slave device $SL_3$ is cascaded to the slave device $SL_4$ (step S233). The invention does not limit how the host device MS determines whether the slave device $SL_3$ is cascaded to the slave device $SL_4$. In one embodiment, the host device MS depends upon the digital value of a specific bit of the response information $RS_3$ to determine whether the slave device $SL_3$ is cascaded to the slave device $SL_4$ When the slave device $SL_3$ is not cascaded to the slave device $SL_4$, the host device MS operates according to the response information $RS_1 \sim RS_3$ (step S234). In one embodiment, the host device MS performs three actions according to the function numbers of the slave devices $SL_1 \sim SL_3$. For example, assume the function number of the slave device $SL_1$ represents a light-emitting action, the function number of the slave device $SL_2$ represents a music play action, and the function number of the slave device $SL_3$ represents a shock action. In step S214, the host device MS successively performs the light-emitting action, the music paly action and the shock action. In some embodiments, assume that the function number of the slave device $SL_1$ represents a go-forward action, the function number of the slave device $SL_2$ represents a turn right action, and the function number of the slave device $SL_3$ represents a turn left action. In this case, the host device MS with the slave devices $SL_1 \sim SL_3$ goes forward, turns right and turns left. In other embodiments, the host device MS first sends a detection end command to direct the slave devices $SL_1 \sim SL_3$ to start to work according to the command INT.

When the slave device $SL_3$ is cascaded to the slave device $SL_4$, the host device MS continuously sends a fourth command to set the identification number of the slave device $SL_4$ and detects the function number of the slave device $SL_4$ (step S240). Since the method replying with the function number built in the slave device $SL_4$ is the same as the method replying with the function number built in the slave device $SL_1$, the description of the method replying with the function number built in the slave device $SL_4$ is omitted. Furthermore, the method that the host device MS controls the slave device $SL_4$ is the same as the method that the host device MS controls the slave device $SL_1$, the description of the method that the host device MS controls the slave device $SL_4$ is omitted.

After each slave device SL stores the exclusive identification number and replies its function number, the host device MS starts to perform a specific action. The specific action may be that the host device MS performs actions corresponding to the function numbers of each of the slave devices or the host device MS directs at least one specific slave device to perform the action corresponding to the function number of the specific slave device. In addition, the host device MS first sends a detection end command and then directs each slave device to perform an action corresponding its function number.

In other embodiments, the host device MS sends an inquiry command to inquire the connection status of each slave device in fixed intervals of time. When a slave device is removed or added or a trigger event occurs in a slave device, a corresponding slave device replies to the host device MS. Assume that the host device MS is cascaded to the slave devices $SL_1 \sim SL_3$. In this case, when a slave device (e.g., $SL_4$) is cascaded to the slave device $SL_3$, the slave device $SL_3$ generates the response information $RS_3$ to notify the host device MS. In one embodiment, the digital values of a plurality of first bits of the response information $RS_3$ means that a new slave device is added. Therefore, the host device MS sends an identification number to the slave device $SL_4$ and detects the function number of the slave device $SL_4$.

In other embodiments, when the slave device $SL_3$ is not cascaded to the slave device $SL_2$, since the connection status of slave device $SL_2$ has changed, slave device $SL_2$ sends the response information $RS_2$ to notify the host device MS. In this case, the response information $RS_2$ has a plurality of first bits and a plurality of second bits. The digital values of the first bits indicate the function number of the slave device $SL_2$. The digital values of the second bits indicate whether the slave device $SL_3$ is removed. When the host device MS determines that the slave device $SL_3$ is removed according to the digital values of the second bits of the response information $RS_2$, the host device MS does not perform the action corresponding the function number of the slave device $SL_3$.

In another embodiment, when a switch disposed in the slave device $SL_1$ is pressed or a user uses a remote controller to trigger the function (e.g. emitting light) of the slave device $SL_1$, the slave device $SL_1$ generates the response information $RS_1$ to notify the host device MS. The host device MS determines whether a trigger event occurs in the slave device $SL_1$ according to the digital values of a plurality of first bits of the response information $RS_1$ and determines whether an additional function is activated according to the digital values of a plurality of second bits of the response information $RS_1$. Therefore, the host device MS not only performs the actions (e.g., a go forward action, a turn right action and a turn left action) corresponding to the function numbers of the slave devices $SL_1 \sim SL_3$, but also performs the additional function or directs the slave device $SL_1$ to perform the additional function, such as to emit light.

In other embodiments, the command INT is a control command to direct a specific slave device to perform an action corresponding its function number. For example, the host device MS may direct the slave device $SL_2$ to play music. In this case, the host device MS sends a specific identification number. Each of the slave devices $SL_1 \sim SL_3$ determines whether the specific identification number is the same as its identification number. Since the specific identification number is the same as the identification number stored in the slave device $SL_2$, only the slave device $SL_2$ operates. In some embodiments, the host device MS may direct various slave devices to perform the same action, such as to emit light. In another embodiment, the host device MS may control the color of the light emitted from the slave device. For example, the host device MS may control the slave devices $SL_1 \sim SL_3$ to display the red light, the yellow light and the green light.

Figure 3:
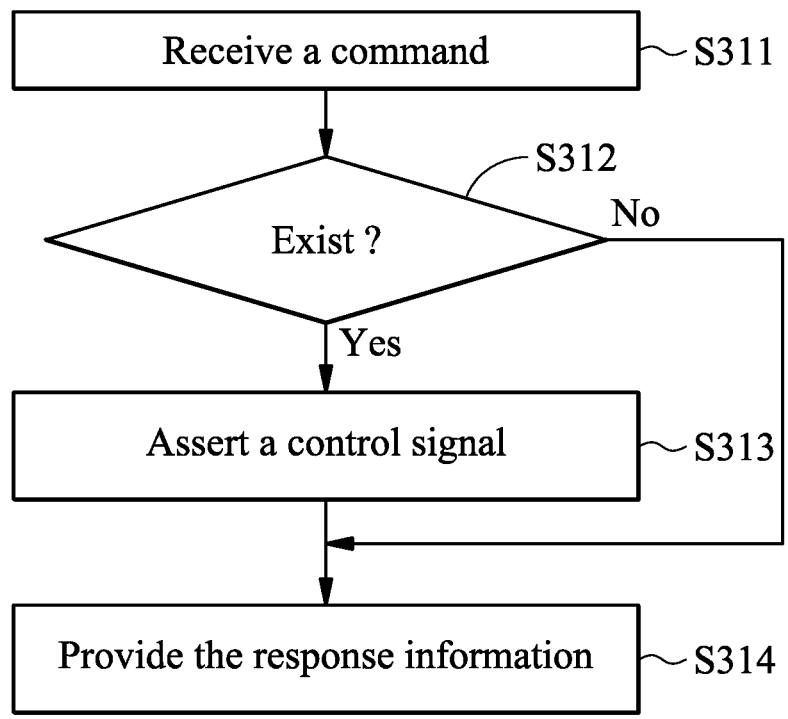
FIG. 3 is a flowchart of another exemplary embodiment of a control method, according to various aspects of the present disclosure.

FIG. 3 is a flowchart of another exemplary embodiment of the control method, according to various aspects of the present disclosure. The control method in FIG. 3 can be applied to each slave device shown in FIG. 1. To brevity, the slave device $SL_1$ is given as an example. First, the slave device $SL_1$ receives a command INT (step S311). In this embodiment, the command INT is a detection command. The slave device $SL_1$ stores an identification number according to the command INT and generates response information $RS_1$ according to the function number built in the slave device $SL_1$. In one embodiment, the command INT is provided by the host device MS.

The slave device $SL_1$ determines whether the slave device $SL_2$ exists (step S312). The invention does not limit how the slave device $SL_1$ determines the existence of the slave device $SL_2$. In one embodiment, when the slave device $SL_2$ is cascaded to the slave device $SL_1$, the voltage level of a specific pin of the slave device $SL_1$ is changed. Therefore, the slave device $SL_1$ determines the existence of the slave device $SL_2$ according to the voltage level of the specific pin.

When the slave device $SL_2$ is cascaded to the slave device $SL_1$, the slave device $SL_1$ asserts the control signal $SC_2$ to direct the slave device $SL_2$ to ready to receive the command INT (step S313). The slave device $SL_1$ provides the response information $RS_1$ to the host device MS (step S314). The invention does not limit the sequence of performing steps 5313 and 5314. The time at which step 5313 is performed may be before or after the time at which step 5314 is performed. The host device MS determines the function number of the slave device $SL_1$ according to the response information $RS_1$.

In one embodiment, the host device MS determines whether the slave device $SL_2$ is cascaded to the slave device $SL_1$ according to the digital value of a specific bit of the response information $RS_1$. When the slave device $SL_2$ is cascaded to the slave device $SL_1$, the host device MS assigns the command INT again. The slave device $SL_2$ stores the identification number assigned by the host device MS and replies response information $RS_2$ to the host device MS according to the function number built in the slave device $SL_2$. Since the slave device $SL_1$ has provided the response information $RS_1$, the slave device $SL_1$ does not depend upon the command INT to operate until the command INT is a detection end command. In this case, the slave device $SL_1$ still receives the command INT provided by the host device MS to determine whether the command INT is a detection end command. When the command INT is not the detection end command, the slave device $SL_1$ does not depend upon the command INT to work. When the command INT is the detection end command, the slave device $SL_1$ operates according to the command INT.

When the slave device $SL_2$ is not cascaded to the slave device $SL_1$ in step S312, the slave device $SL_1$ sends the response information $RS_1$ to the host device MS (step S314). When the host device MS determines that the slave device $SL_2$ is not cascaded to the slave device $SL_1$ according to the response information $RS_1$, the host device MS only depends upon the function number of the slave device $SL_1$ to work. In other embodiments, when many slave devices are cascaded together, the host device MS performs actions according to the function numbers of different slave devices.

In other embodiments, when the slave device $SL_1$ receives an inquiry command, the slave device $SL_1$ determines whether a trigger event occurs. The trigger event may be that a button of the slave device $SL_1$ is pressed or the slave device $SL_1$ is triggered by a remote controller. When the trigger event occurs, the slave device $SL_1$ sends the response information $RS_1$ to notify the host device MS. The host device MS executes a specific action according to the response information $RS_1$ or directs the slave device $SL_1$ to execute the specific action. For example, when the button of the slave device $SL_1$ is pressed, the host device MS executes an action (e.g., a light-emitting action) corresponding to the button or directs the slave device $SL_1$ to executes the action corresponding to the button.

Figure 4A:
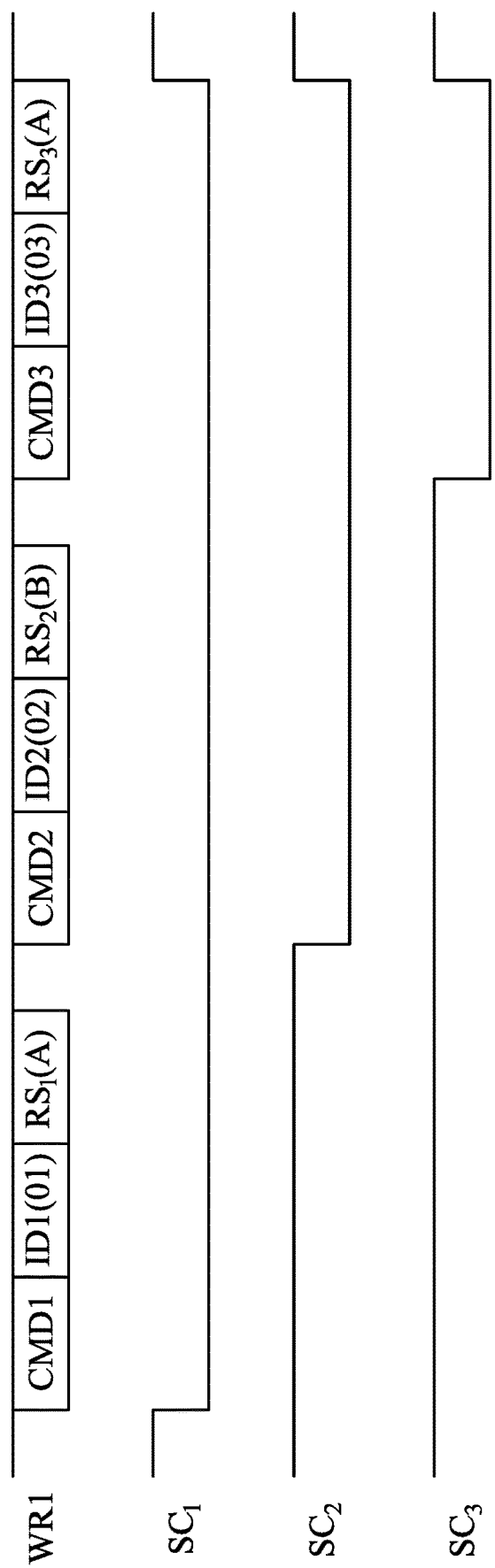
FIG. 4A is a timing schematic diagram of an exemplary embodiment of the operation system, according to various aspects of the present disclosure.

FIG. 4A is a timing schematic diagram of an exemplary embodiment of the operation system, according to various aspects of the present disclosure. In this case, when the slave devices $SL_1SL_3$ are cascaded to each other, the host device MS provides detection commands CMD1~CMD3. The detection commands CMD1~CMD3 are utilized to assign identification numbers to the slave devices $SL_1$~$SL_3$ and detect the function numbers of the slave devices $SL_1$~$SL_3$.

To detect the function number of the slave device $SL_1$, the host device MS asserts the control signal $SC_1$ to activate the slave device $SL_1$ to ready to receive the detection command CMD1. In this embodiment, when the control signal $SC_1$ is at a low level, it means that the control signal $SC_1$ is asserted, but the disclosure is not limited thereto. In another embodiment, when the control signal $SC_1$ is at a high level, it means that the control signal $SC_1$ is asserted. In other embodiments, when the frequency or the duty cycle of the control signal $SC_1$ is equal to a predetermined value, it means that the control signal $SC_1$ is asserted.

Since the control signal $SC_1$ is at the low level, the slave device $SL_1$ receives and stores an identification number ID1 (e.g., 01) according to the detection command CMD1 and generates the response information $RS_1$ to the host device MS according to the function number (e.g., A) built in the slave device $SL_1$. In one embodiment, the function number is stored in the slave device $SL_1$ in advance. In other embodiments, when the slave device $SL_1$ detects the existence of the slave device $SL_2$, the slave device $SL_1$ sends the response information $RS_1$ to notify the host device MS and asserts the control signal $SC_2$ to direct the slave device $SL_1$ to ready to receive the detection command CMD2. In this case, since the slave device $SL_1$ has replied according to the detection command CMD1, the slave device $SL_1$ does not depend upon the detection commands CMD2 and CMD3 to operate. However, when the host device MS sends a detection end command, the slave device $SL_1$ starts operating according to the commands transmitted by the wire WR1.

The host device MS determines the existence of the slave device $SL_2$ according to the response information $RS_1$ such that the host device MS sends the detection command CMD2. Since the slave device $SL_1$ asserts the control signal $SC_2$, the slave device $SL_2$ stores the identification number ID2 (e.g., 02) according to the detection command CMD2 and generates response information $RS_2$ to the host device MS according to the function number (e.g., B) built in the slave device $SL_2$.

Since the slave device $SL_3$ is cascaded to the slave device $SL_2$, the slave device $SL_2$ sends the response information $RS_2$ to notify the host device MS and asserts the control signal $SC_3$. The host device MS determines the existence of the slave device $SL_3$ according to the response information $RS_2$. Therefore, the host device MS sends the detection command CMD3. The slave device $SL_3$ stores the identification number ID3 (e.g., 03) according to the detection command CMD3 and generates response information $RS_3$ to host device MS according to the function number built in the slave device $SL_3$. At this time, since the slave device $SL_2$ has notified its function number, the slave device $SL_2$ does not depend upon the detection command CMD3 to operate.

Since the slave device $SL_3$ is only cascaded to the slave device $SL_2$ and the function number of the slave device $SL_3$ has been determined by the host device MS, the host device MS does not send detection commands. In one embodiment, the host device MS sends a detection end command to direct the slave devices $SL_1$~$SL_3$ to work according to the command INT transmitted by the wire WR1.

Figure 4B:
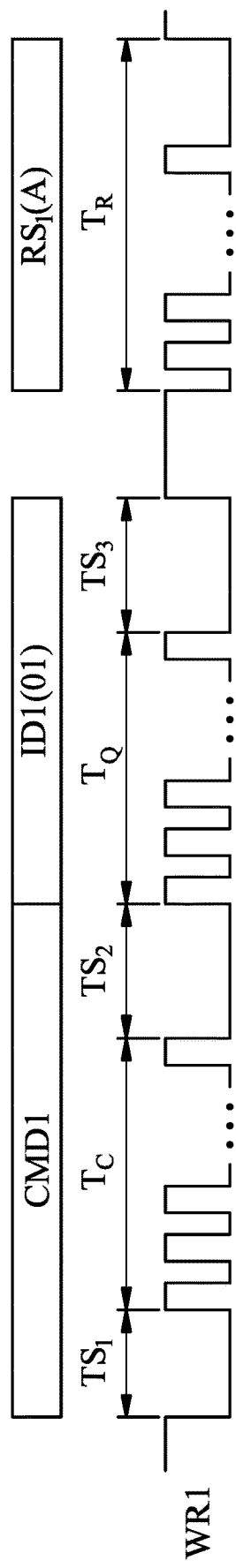
FIG. 4B is a schematic diagram of an exemplary embodiment of a detection command, an identification number and response information, according to various aspects of the present disclosure.

FIG. 4B is a schematic diagram of an exemplary embodiment of the detection command CMD1, the identification number ID1 and the response information $RS_1$, according to various aspects of the present disclosure. As shown in FIG. 4B, each of the detection command CMD1, the identification number ID1 and the response information $RS_1$ has many pulses. The number of the pulses and/or the duty cycle is adjust to form different detection commands, different identification numbers and different response information.

In this embodiment, the detection command CMD1 has a start period $T_{S1}$, a command period TC and an end period $T_{S2}$. During the start period $T_{S1}$ and the end period $T_{S2}$, the voltage level of the wire WR1 is a low level, and the duration when the voltage level of the wire WR1 is maintained to the low level arrives a predetermined time. Therefore, the slave device $SL_1$ operates according to the pulses in the command period $T_C$. In one embodiment, the slave device $SL_1$ determines the type of the command INT according to the number of the pulses or the duty cycle in the command period $T_C$.

The identification number ID1 comprises a queue period $T_Q$ and an end period $T_{S3}$. In the queue period $T_Q$, the host device MS sends a plurality of pulses. The pulses mean an identification number. In the end period $T_{S3}$, the voltage level of the wire WR1 is the low level and the duration when the voltage level of the wire WR1 is maintained to the low level arrives predetermined time. Therefore, the slave device $SL_1$ determines and stores an identification number according to the pulses in the queue period $T_Q$. identification number according to the pulses in the queue period $T_Q$.

After the host device MS sends the identification number ID1 for a period of time, the host device MS receives the response information $RS_1$ of the slave device $SL_1$. In one embodiment, when the host device MS waits the response information $RS_1$, the voltage level of the wire WR1 is a high level. In other embodiments, the slave device $SL_1$ readies to provide the response information $RS_1$ before the end period $T_{S3}$. Therefore, after the end period $T_{S3}$, the slave device $SL_1$ immediately outputs the response information $RS_1$. In this embodiment, the slave device $SL_1$ generates a plurality of pulses to the host device MS according to its function number during a return period $T_R$.

Figure 5:
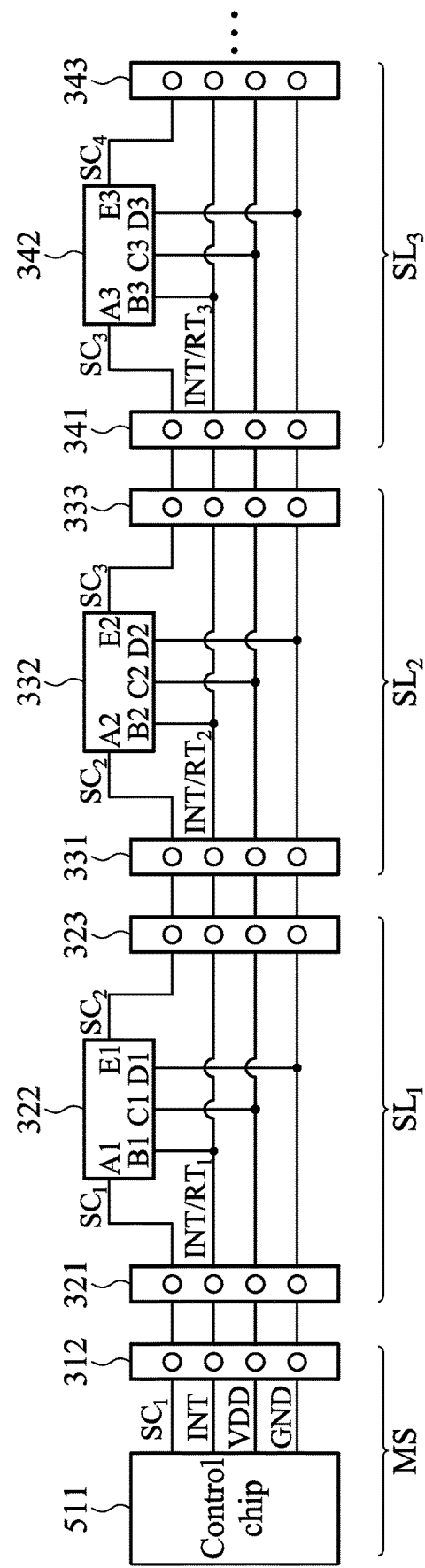
FIG. 5 is a connection schematic diagram of an exemplary embodiment of a host device and slave devices, according to various aspects of the present disclosure.

FIG. 5 is a connection schematic diagram of an exemplary embodiment of a host device and slave devices, according to various aspects of the present disclosure. To brevity, FIG. 5 only shows the slave devices $SL_1 SL_3$. As shown in FIG. 5, the host device MS has a control chip 511 and a connection interface 512. The control chip 511 outputs the control signal $SC_1$, the command INT and operation voltages VDD and GND via the connection interface 512.

The slave device $SL_1$ comprises a control chip 522 and connection interfaces 521 and 523. The connection interface 521 is configured to couple to the host device MS. The connection interface 523 is configured to couple to the slave device $SL_2$. In this embodiment, the control chip 522 has input output pads A1, B1, C1, D1 and E1. The input output pad A1 is configured to receive the control signal $SC_1$. The input output pad B1 is configured to receive the command INT and output the response information $RS_1$. The input output pad C1 is configured to receive the operation voltage VDD. The input output pad D1 is configured to receive the operation voltage GND. The input output pad E1 is configured to output the control signal $SC_2$.

The slave device $SL_2$ comprises a control chip 532 and connection interfaces 531 and 533. The connection interface 531 is configured to couple to the slave device $SL_1$. The connection interface 533 is configured to couple to the slave device $SL_3$. Since the internal circuit structure of the slave device $SL_2$ is the same as the internal circuit structure of the slave device $SL_1$, the description of the internal circuit structure of the slave device $SL_2$ is omitted.

The slave device $SL_3$ comprises a control chip 542 and connection interfaces 541 and 543. The connection interface 541 is configured to couple to the slave device $SL_2$. The connection interface 543 is configured to couple to a next slave device (e.g., $SL_4$). Since the internal circuit structure of the slave device $SL_3$ is the same as the internal circuit structure of the slave device $SL_1$, the description of the internal circuit structure of the slave device $SL_3$ is omitted.

The host device MS performs at least one corresponding action according to the function numbers of the cascaded slave devices. When different slave devices are cascaded to each other, the host device MS performs different actions. Additionally, the host device MS communicates with many slave devices via a single wire (e.g., WR1) such that the connection interface between the host device MS and the slave devices can be simplified.

Control methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A control method for a host device coupled to a first slave device, comprising:
   sending a first detection command and a first identification number to the first slave device;
   receiving first response information generated by the first slave device to determine a first function number stored in the first slave device;
   determining whether the first slave device is cascaded to a second slave device,
   wherein in response to determining that the first slave device is not cascaded to the second slave device, the host device performs a first specific action according to the first function number or directs the first slave device to perform the first specific action, and
   wherein in response to determining that the first slave device is cascaded to the second slave device, the host device assigns a second detection command and a second identification number to the second slave device and receives second response information generated by the second slave device to determine a second function number stored in the second slave device.

2. The control method as claimed in claim 1, wherein in response to determining that the first slave device is cascaded to the second slave device, the host device performs the first specific action according to the first function number and performs a second specific action according to the second function number.

3. The control method as claimed in claim 1, wherein in response to determining that the first slave device is cascaded to the second slave device, the host device directs the first slave device to perform the first specific action and directs the second slave device to perform a second specific action.

4. The control method as claimed in claim 1, wherein the host device determines whether the first slave device is cascaded to the second slave device according to a digital value of a specific bit of the first response information.

5. The control method as claimed in claim 4, wherein in response to the digital value of the specific bit being equal to a predetermined value, the host device determines that the first slave device is cascaded to the second slave device, and in response to the digital value of the specific bit not being equal to the predetermined value, the host device determines that the first slave device is not cascaded to the second slave device.

6. The control method as claimed in claim 5, wherein after the first slave device provides the first response information to the host device, the first slave device ignores commands sent by the host device until the host device sends a detection end command.

7. The control method as claimed in claim 6, wherein in response to the second slave device not being cascaded to a third slave device and the host device receiving the second function number, the host device sends the detection end command such that the first and second slave devices operate according to commands sent from the host device.

8. The control method as claimed in claim 7, further comprising:
sending an inquiry command to inquire statuses of the first and second slave devices.

9. The control method as claimed in claim 8, wherein in response to a trigger event occurring on the first or second slave device, the host device performs a third specific action or directs the first or second slave device to perform the third specific action.

10. A control method for a first slave device coupled to a host device, comprising:
receiving a detection command and an identification number from the host device;
storing the identification number;
determining existence of a second slave device, wherein in response to the second slave device being cascaded to the first slave device, the first slave device ignores commands sent by the host device and provides a control signal to the second slave device; and
providing first response information to the host device;
wherein the host device is directly connected to the first slave device and the second slave device;
wherein in response to determining that the first slave device is not cascaded to the second slave device, the host device performs a first specific action according to the first function number or directs the first slave device to perform the first specific action.

11. The control method as claimed in claim 10, wherein in response to the first slave device receiving a detection end command, the first slave device operates according to commands sent by the host device.

12. The control method as claimed in claim 11, wherein in response to the first slave device receiving an inquiry command, the first slave device determines whether a trigger event is caused, and
wherein in response to the trigger event having been caused, the first slave device generates second response information and the host device performs a specific action or directs the first slave device to perform the specific action according to the second response information.

13. A control method for controlling a host device and slave devices, comprising:
sending a first detection command and a first identification number generated by the host device to a first slave device of the slave devices;
receiving first response information generated by the first slave device to determine a first function number stored in the first slave device; and checking to determine whether the first slave device is cascaded to a second slave device of the slave devices,
wherein in response to determining that the first slave device is cascaded to the second slave device according to a digital value of a specific bit of the first response information, the host device assigns a second detection command and a second identification number to the second slave device and receives second response information generated by the second slave device to determine a second function number stored in the second slave device.

14. The control method as claimed in claim 13, wherein in response to the digital value of the specific bit being equal to a predetermined value, the host device determines that the first slave device is cascaded to the second slave device, and in response to the digital value of the specific bit not being equal to the predetermined value, the host device determines that the first slave device is not cascaded to the second slave device.

15. The control method as claimed in claim 14, wherein after the first slave device provides the first response information to the host device, the first slave device does not depend on the second detection command to operate.

* * * * *